Oct. 23, 1962   L. R. PEILET ETAL   3,059,259
RETRACTABLE BRUSHES
Filed July 7, 1959   3 Sheets-Sheet 2
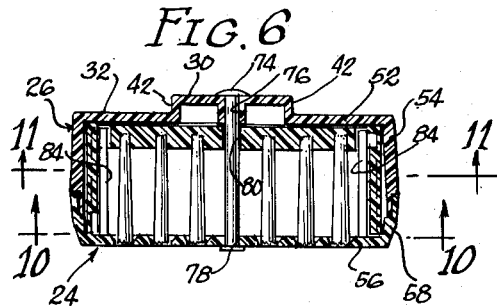
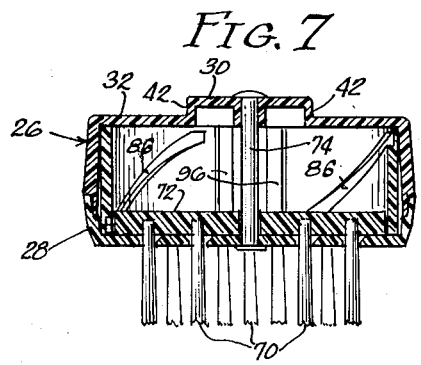
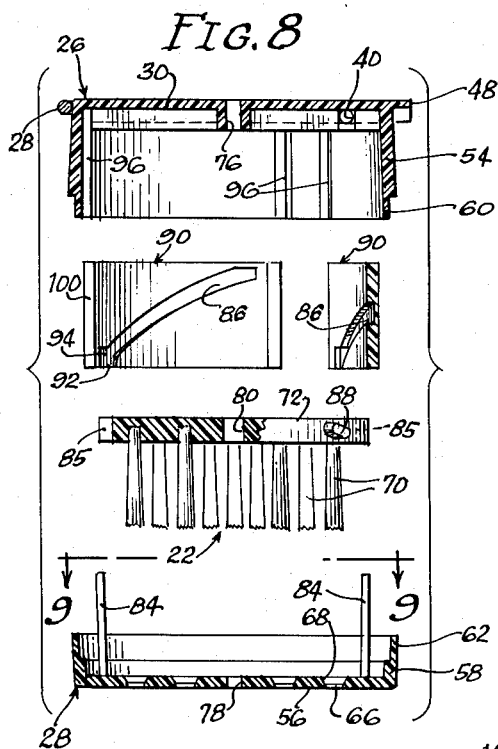
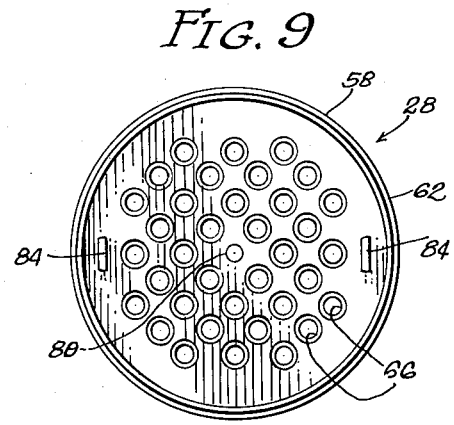
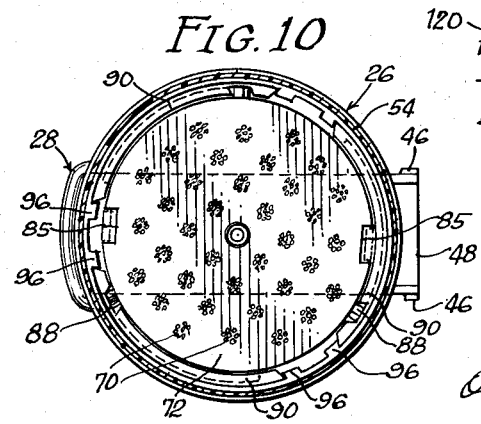
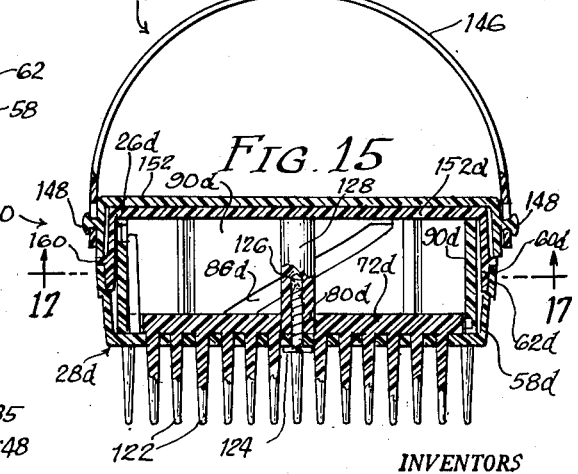
INVENTORS
Lester R. Peilet
BY Henry G. Saperstein
Adolph Eddy Goldfarb
Attorneys Oct. 23, 1962    L. R. PEILET ETAL    3,059,259
RETRACTABLE BRUSHES
Filed July 7, 1959    3 Sheets-Sheet 3
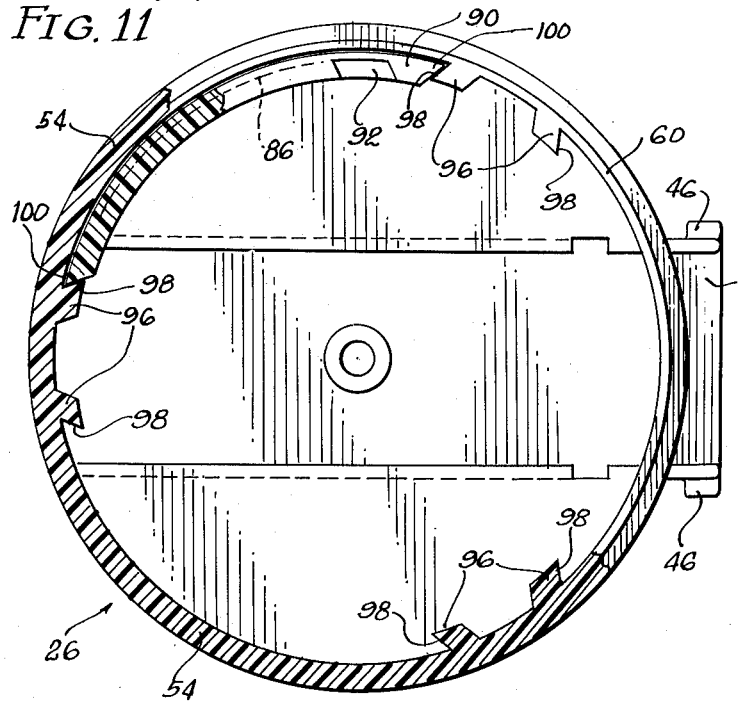
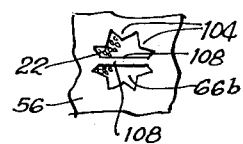
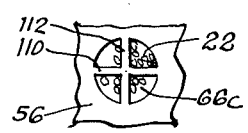
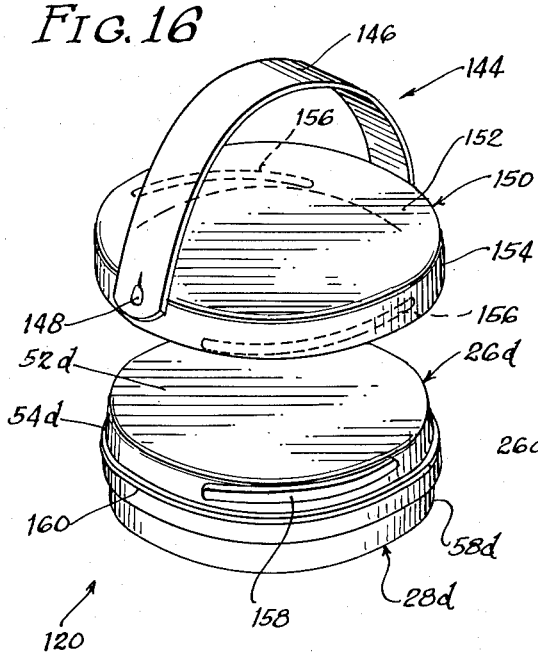
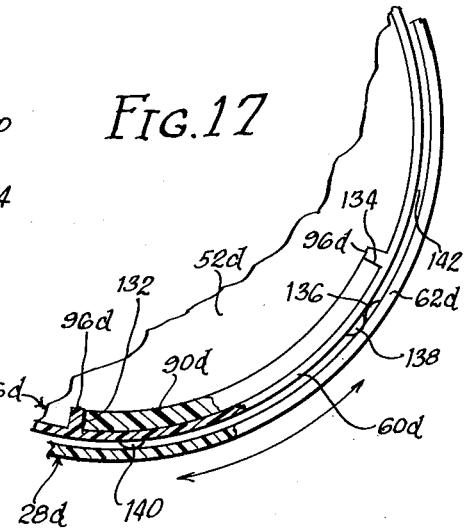
INVENTORS
Lester R. Peilet
BY Henry G. Saperstein
Adolph Eddy Goldfarb
Attorneys

United States Patent Office 3,059,259
Patented Oct. 23, 1962

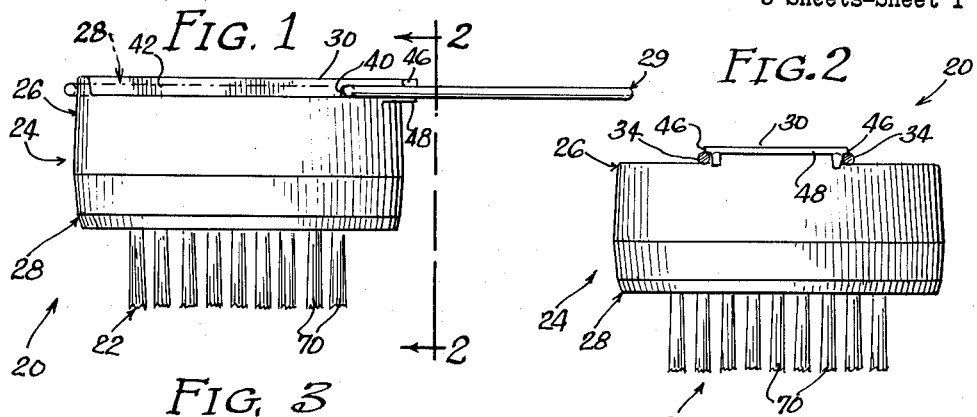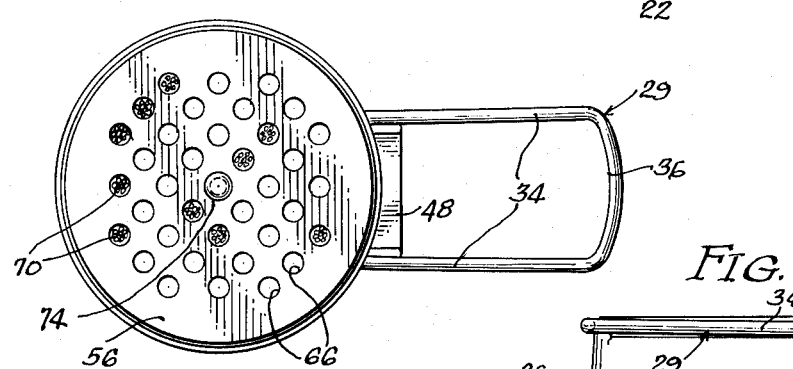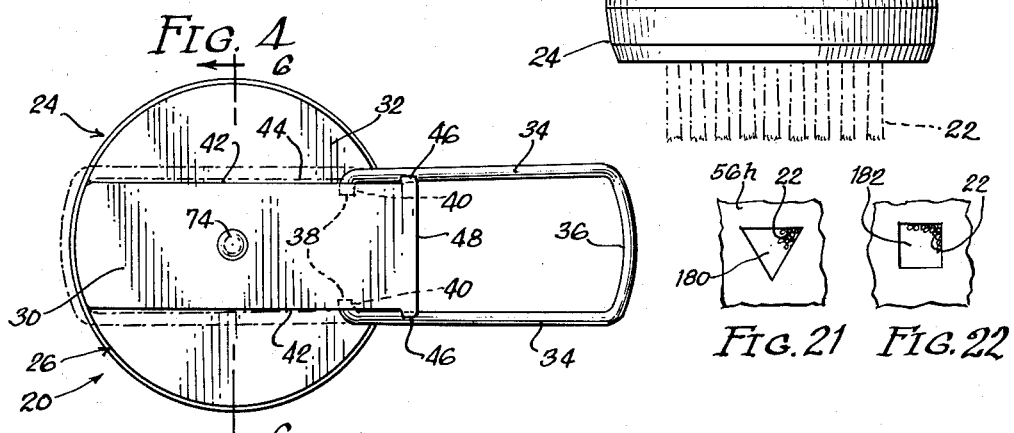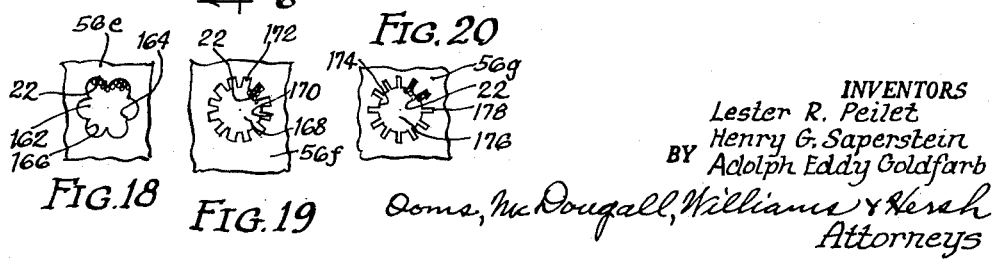

3,059,259
RETRACTABLE BRUSHES
Lester R. Peilet, 3933 N. Tucson Blvd., Tucson, Ariz.;
Henry G. Saperstein, 9311 Readcrest, Los Angeles,
Calif.; and Adolph E. Goldfarb, 6927 Nagle, North
Hollywood, Calif.
Filed July 7, 1959, Ser. No. 825,533
6 Claims. (Cl. 15—184)

This invention relates to retractable brushes of the type having bristles which are adapted to be extended and retracted into and out of a casing in response to relative rotation between a pair of members on the casing.

In some aspects, the present invention may be regarded as an improvement upon the invention disclosed and claimed in Patent No. 2,865,039, issued December 23, 1958, on the application of Philip Kaye and Edward E. Tate.

One object of the present invention is to provide a new and improved retractable brush in which the bristles are extended and retracted by means of cam members arranged in a new and improved manner.

A further object is to provide a new and improved retractable brush of the foregoing character in which the casing of the brush and the cam members are formed as separate elements which are easily assembled and which are so arranged that the cam members are positively retained in their operating positions within the casing.

Another object is to provide a new and improved retractable brush which is so arranged that foreign matter is cleaned off the bristles with improved effectiveness, when the bristles are retracted.

Another object is to provide a new and improved brush which is equipped with a handle which folds against the brush in a new and improved manner, so that the brush will occupy a minimum of space when carried in a pocket, purse or the like.

A further object is to provide a retractable brush having a new and improved detent arrangement for keeping the brush in its retracted and extended positions.

Another object is to provide a new and improved brush having a handle which may be removed completely from the brush, or may simply be folded so that it will be out of the way when the brush is carried in a pocket, handbag or the like.

Further objects and advantages of the present invention will appear from the following description, taken with the accompanying drawings, in which:

FIG. 1 is a side elevational view of a retractable brush to be described as an illustrative embodiment of the present invention.

FIG. 2 is an elevational view taken at right angles to FIG. 1 and partly in section along a line 2—2 in FIG. 1.

FIG. 3 is a bottom or front view of the brush.

FIG. 4 is a top or back view.

FIG. 5 is a view similar to FIG. 1, but showing the handle of the brush in its folded position.

FIG. 6 is an elevational section, taken generally along a line 6—6 in FIG. 4.

FIG. 7 is a view similar to FIG. 6, but showing the bristles in their extended position.

FIG. 8 is an exploded view showing the parts of the brush disassembled and partly in section along the line 6—6 in FIG. 4.

FIG. 9 is a top view of the lower casing member of the brush, taken as indicated by the line 9—9 in FIG. 8.

FIG. 10 is a bottom view of the brush with the lower casing member removed, the view being taken as indicated by the line 10—10 in FIG. 6.

FIG. 11 is an enlarged view somewhat similar to FIG. 10, but with the bristle supporting member and two of the cam members removed, the view being partly in section along a line 11—11 in FIG. 6.

FIGS. 12, 13 and 14 are fragmentary views illustrating modified forms of bristle openings in the bristle cleaning member of the brush.

FIG. 15 is a view similar to FIG. 7, but showing a somewhat modified brush.

FIG. 16 is a perspective view of the brush shown in FIG. 15, to show the manner in which the removable handle is detached.

FIG. 17 is a fragmentary enlarged section, taken generally along a line 17—17 in FIG. 15.

FIGS. 18, 19, 20, 21 and 22 are fragmentary bottom views illustrating additional modified forms of bristle openings in the bristle cleaning member of the brush shown in FIGS. 1-11.

As already indicated, FIGS. 1-11 illustrate a retractable brush 20 having bristles 22 which are adapted to be extended and retracted into and out of a casing or housing 24. As shown, the casing 24 comprises upper and lower members or shells 26 and 28. The bristles 22 are extended and retracted by rotating the members 26 and 28 relative to each other through a limited range.

As shown in FIGS. 1 through 5, the brush 20 is equipped with a folding handle 29, swingable between the extended position of FIG. 1 and the folded position of FIG. 5. The handle 28 is mounted on a bar-shaped formation or portion 30 which projects upwardly above the flat upper surface 32 of the upper casing member 26. From FIG. 4, it will be apparent that the bar portion 30 extends across the back or upper side of the brush 20 from side to side.

The illustrated handle 28 is generally U-shaped and is made of wire. Thus, the handle 28 comprises a pair of generally parallel legs 34. A cross-bar 36 extends between the legs 34 at one end. The opposite ends of the legs 34 are turned inwardly to form prongs or pivots 38, which are received in openings 40 formed in the bar 30. More specifically, the openings 40 are formed in parallel, vertical side walls 42 of the bar 30. The walls 42 project upwardly from the flat upper surface 32 of the casing 24.

It will be seen that the openings 40 which support the pivots 38 are disposed toward the right hand side of the brush 20, as illustrated in FIG. 4. The portion of the bar 30 to the left of the openings 40 corresponds generally in size and shape to the openings within the U-shaped handle 28. Actually, the opening in the handle 28 is somewhat larger than the bar 30 so that the handle will pass over the bar when it is swung into its folded position against the upper surface 32.

To detain the handle 28 in its folded position, a detent rib 44 is arranged to project laterally from one of the side surfaces 42 of the bar portion 30. When the handle 28 is folded, the detent 44 springs one of the legs 34 outwardly to a slight extent, so that the leg will exert definite force against the detent element. The detent element 44 thereby provides definite frictional resistance to movement of the handle 28 from its folded position.

When the handle 28 is extended, it is swung through substantially 180 degrees into the position shown in FIGS. 1, 3 and 4. The handle 28 then extends to the right beyond the casing 24.

The handle 28 is detained in its extended position by a pair of detent elements, in the form of prongs or knobs 46 projecting laterally from the walls 42, to the right of the pivot openings 40. It will be seen that the detent prongs 46 are on an outboard portion 48 of the bar 30, extending a short distance to the right of the casing 24. The prongs 46 are spaced upwardly from the top surface 32 so that the legs 34 of the handle 28 can move downwardly below the prongs when the handle is fully extended. In order to move the handle 28 past the prongs 46, it is necessary to exert sufficient extra force on the handle to cause the legs 34 to spring outwardly. Thus, the prongs 46 effectively detain the handle in its extended position.

As shown in FIGS. 6, 7 and 8, the upper casing member 26 has a flat generally circular upper wall 52 and a generally cylindrical side wall 54 extending downwardly therefrom. Similarly, the lower casing member 28 has a substantially flat circular lower wall 56 with an annular side wall 58 extending upwardly therefrom. Along its lower margin, the side wall 54 is externally reduced in thickness to form an annular flange 60. The lower side wall 58 is internally reduced in thickness to form an annular flange 62. When the upper and lower members 26 and 28 are assembled, the flange 60 is received within the flange 62. In this way, the members 26 and 28 are guided for relative rotation with respect to each other.

The bristles 22 are adapted to pass inwardly and outwardly through a large number of holes or openings 66 formed in the lower wall 56 of the member 28. As shown to best advantage in FIG. 8, each hole 66 may be bevelled around in its inner end to form a flaring inner portion 68 which facilitates the entry of the bristles 22. In this case, the bristles 22 are mounted in a plurality of tufts 70 on a supporting member or plate 72 which is movable upwardly and downwardly within the casing 24. Each tuft 70 may contain a large number of individual bristles.

The upper and lower casing members 26 and 28 may be held together by means of a rivet or other suitable fastener 74, which extends through aligned holes 76, 78 and 80 in the upper member 26, the lower member 28, and the bristle supporting plate 72. The rivet 74 extends axially through the casing 24 so that the members 26 and 28 may rotate about the rivet. Thus, the rivet 74 serves as a shaft or pivot.

When the lower casing member 28 is rotated relative to the upper member 26, the bristle supporting member 72 is moved upwardly and downwardly, so as to retract and extend the bristles 22 into and out of the casing 24. The bristles 22 and the bristle supporting plate 72 are caused to rotate with the lower casing member 28, by virtue of the engagement of the bristle tufts 70 with the holes 66 in the lower wall 56 of the member 28. Even when the bristles 22 are fully retracted, as shown in FIG. 6, the tips of the bristle tufts 70 extend into the holes 66. To assist in rotating the bristle supporting plate 72, the lower casing member 28 is formed with a pair of upwardly projecting posts or fingers 84 which are slidably engaged with notches or slots 85 in the edge of the plate 72. The posts 84 permit the plate 72 to slide upwardly and downwardly, while constraining the plate to rotate with the lower casing member 28.

The retracting and extending movement of the bristles 22 is brought about by a plurality of cam tracks 86, which in this case are adapted to cooperate with cam follower elements 88 on the bristle supporting plate 72. In this case, there are three of the tracks 86 and followers 88. As shown, the cam tracks 86 take the form of generally helical grooves formed in cam members 90. The follower elements 88 are shown as lugs projecting outwardly from the edge of the plate 72. It will be seen that the lugs 88 are slanted so as to slide smoothly along the slanting cam grooves 86. At its lower end, each groove 86 has an opening or entrance 92 through which the corresponding lug 88 is inserted when the brush is being assembled. The lower end of each groove 86 is formed into a short section 94 which extends in a circumferential direction rather than being helically slanted. The lugs 88 enter the circumferential groove sections 94 when the bristles 22 are fully extended. Thus, presure may be applied to the bristles without tending to cause them to retract.

As shown to best advantage in FIGS. 10 and 11, the upper casing member 26 and the illustrated cam members 90 are formed as separate pieces. Thus, the cam members 90 are arcuate and cylindrically curved and are adapted to extend along the inside of the side wall 54. The members 90 are retained by ribs 96 which project inwardly from the side wall 54 and engage the ends of the members 90. The ribs 96 extend parallel to the axis of the casing member 26. To insure that the members 90 will be positively retained against radially inward movement, the ribs 96 are formed with undercut lips 98 which overhang chisel-shaped end portions 100 on the members 90.

The cam members 90 may easily be slid into position, during the assembly of the brush, by sliding the members 90 parallel to the axis of the casing 24. Once the members 90 are in place, the ribs 96 prevent them from being displaced radially or circumferentially. The lower wall 56 of the lower casing member 28 confines the cam members 90 against downward movement, as illustrated to good advantage in FIG. 6. Thus, the cam members 90 are confined between the upper and lower walls 52 and 56.

While the members 26, 28, 72 and 90 may be made of various materials, it is preferred to mold them out of various plastics, such as polystyrene, polyethylene or the like. It will be noted that the cam members 90 are molded separately from the upper casing member 20, which greatly facilitates the molding of the parts.

In assembling the brush 20, the cam members 90 are slid into the upper casing member 26. Next, the plate 72, with the bristles 22 already mounted thereon, is inserted into the casing member 26. The lugs 88 are aligned with the openings 92 so that the lugs will enter the cam grooves 86. The lower casing member 28 is then properly oriented and is slipped into place over the lower end of the upper member 26. The fingers 84 are aligned with the notches 85 in the plate 72. Care is taken to see that the bristle tufts 70 enter the holes 66. The casing members 26 and 28 are then secured together by inserting and setting the rivet 74. The handle 28 may be formed on the brush by springing apart the legs 34 so that the prongs 38 can enter the openings 40.

When the brush 20 is being carried, the handle 28 is swung to its folded position, as shown in FIG. 5. The detent 44 springs one of the legs 34 outwardly to provide frictional resistance tending to retain the handle in its folded position.

When the brush is to be used, the handle 28 is swung the extended position shown in FIGS. 1, 3 and 4. As it is moved to its extended position, the handle 28 snaps past the detent prongs 46, so that the handle will be detained in its extended position.

The bristles 28 are extended by rotating the casing members 26 and 28 relative to each other through a limited range, corresponding to the annular length of the cam grooves 86. The bristles 22 and the bristle supporting plate 72 rotate with the lower casing member 28, by virtue of the engagement of the fingers 84 with the notches 85, and also because of the engagement of the bristle tufts 70 with the holes 66. As the bristle plate 72 is rotated, the action of the cam grooves 86 on the lugs 88 causes the plate 72 to be moved toward the wall 56. When the bristles 22 are fully extended, the lugs 88 move into the circumferential end portions 94 of the grooves 86, so that pressure may be applied to the bristles 22 without causing them to retract.

After the brush has been used for brushing the hair, or for any other purpose, the bristles 22 may be retracted by rotating the member 28 in the opposite direction, relative to the member 26. As the bristles 22 are retracted, they are withdrawn through the holes 66 in the lower wall 56. Any hair or other foreign matter on the bristles is scraped off by the wall 56. This self-cleaning action is an important advantage of the retractable brush.

In the brush shown in FIGS. 1–11, the holes or openings 66 for the bristle tufts 70 are circular. They must be large enough to provide for easy passage of the bristle tufts 70. FIGS. 12, 13 and 14 show various ways in which the shape of the bristle openings may be modified, so as to improve the cleaning action of the plate or wall 56 when the bristles are retracted through the openings. In these views, the bristle openings are shown on an enlarged scale.

Thus, FIG. 12 shows a construction in which the brush is provided with bristle openings 66a which are generally circular in shape, but are provided with a large number of serrations or teeth 104 projecting into the openings. Generally V-shaped notches 106 are formed between the teeth 104. A few of the bristles 22 are shown in FIG. 12, to illustrate the manner in which the bristles spread out to enter the notches 106 and to engage the teeth 104. It will be apparent that the teeth or serrations 104 scrape foreign matter off the bristles 22 with enhanced efficiency.

FIG. 13 illustrates another construction having bristle openings 66b. As in FIG. 12, serrations 104 are arranged to project into the openings 66b. In addition, a thin cross-bar 108 extends diametrically across the opening 66b so as to divide it into two parts. The crossbar 108 may be molded integrally with the plate or wall 56. A few of the bristles 22 are shown to illustrate the manner in which the cross-bar 108 scrapes off the bristles, so that they will be cleaned with improved efficiency.

The construction of FIG. 14 utilizes bristle openings 66c. Each opening 66c is formed with two cross-bars 110 and 112, extending at right angles to each other. Thus, the opening 66c is divided into four parts. The bristles 22 in each tuft 70 are divided into four groups so that the cross-bars 110 and 112 will clean off the bristles in an improved manner. The opening 66c is shown as being circular, but may be serrated, as illustrated in FIGS. 12 and 13.

FIGS. 15, 16 and 17 illustrate a somewhat modified brush 120, which, however, is similar in many respects to the brush of FIGS. 1–11. To the extent that the construction of the two brushes is substantially the same, the same reference characters have been applied to FIGS. 15–16, with the addition of the suffix d, so that the description directed to FIGS. 1 through 11 may be read upon FIGS. 15, 16 and 17. The following description will be concerned primarily with the differences between the brushes.

It will be apparent immediately that the brush 120 of FIG. 15 has relatively thick, tapering individual bristles 122 which replace the bristle tufts 70 of FIGS. 1–11. The bristles 122 are preferably molded integrally with the bristle plate 72d, which may be made of a relatively resilient, flexible plastic, such as polyethylene, so that the bristles will have an appropriate degree of flexibility. Otherwise, the modified bristle plate 72d may be the same as the bristle plate 72 of FIGS. 1–11.

In this case, the upper and lower casing members 26d and 28d are held together by means of a screw 124, which replaces the rivet 74 of FIGS. 1–11. The screw 124 may be of the self tapping type and may be tapped into a bore 126 formed in an axial post 128 which extends downwardly from the upper wall 52d. The post 128 may be molded integrally with the upper casing member 26d. The opening 80d in the bristle plate 72d is large enough to be received freely around the post 128.

As shown to best advantage in FIG. 17, the undercutting of the ribs 96d is much less pronounced than in the case of the ribs 96. Thus, the ribs 96d have nearly radial side walls or surfaces 132 which engage complementary end surfaces 134 on the cam members 90d. It will be apparent that the ribs 96d may actually extend radially, while still retaining the cam members 90d against inward displacement.

As shown in FIG. 17, detent elements 136, 138 and 140 are provided on the rotatable casing members 26d and 28d to detain the brush in its extended and retracted positions. In this case, the detent element 136 is on the member 28d, while the detent elements 138 and 140 are formed on the member 26d. The detent element 136 takes the form of a rib which projects inwardly from the flange position 62d of the lower side wall 58d. Similarly, the detent elements 138 and 140 are in the form of ribs which project outwardly from the flange 60d. The flanges 60d and 62d dimensioned to provide an annular clearance space 142 therebetween, of a width corresponding to the height of the ribs 136, 138 and 140.

The ribs 138 and 140 are spaced along the flange 60d so that the rib 136 will snap past the rib 138 as the bristles 122 are moved into their full retracted position. The elements 136 and 138 will thus detain the brush in its retracted position. The flanges 60d and 62d are sufficiently flexible to permit the detent rib 136 to snap past the rib 138. When the casing member 28d is rotated in the opposite direction, the rib 136 will snap past the rib 140 as the bristles 122 reach their fully extended position. Thus, the ribs 136 and 140 will prevent accidental rotation of the members 26d and 28d, so that the bristles will be retained in their extended positions. The illustrated brush 120 may be provided with three sets of the detent elements 136, 138, and 140.

The brush 120 of FIGS. 15, 16 and 17 is provided with a removable handle unit 144, instead of the handle 28. The illustrated unit 144 comprises a strap 146 which is flexed into a generally semi-circular shape. The ends of the handle 146 are secured to headed pivot studs 148, so that the handle may be swung downwardly to extend around one side portion of the brush 120. In this case, the pivot studs 148 are mounted or formed on a separate cap 150 which is adapted to be detachably secured to the casing member 26d. However, in some cases, the studs 148 might be formed directly on the member 26d.

The illustrated cap 150 has a substantially flat top wall 152, with a generally cylindrical side wall 154 extending downwardly therefrom. As shown in FIG. 15, the side wall 154 is adapted to be slipped over the side wall 54d of the upper casing member 26d. Internal thread segments 156 are formed on the inside of the side wall 154, for engagement with external thread segments 158 on the side wall 54d. An outwardly projecting annular ridge or flange 160 is formed on the side wall 54d, so as to be opposite the lower edge of the side wall 154. On the lower side, the flange 160 is opposite the flange 62d.

It will be apparent that the handle unit 144 may easily be removed from the brush 120 simply by unscrewing the cap 150 from the casing member 26d. When the handle unit 144 is in place on the brush 120, the handle strap 146 may be swung downwardly around one side portion of the cap 150, so that the strap will be out of the way when the brush is being carried in a pocket, handbag or the like.

FIGS. 18, 19, 20, 21 and 22 illustrate other modified forms of bristle openings in the bristle cleaning plate or wall 56 of FIGS. 1–11. It will be understood that the modified bristle openings may also be employed in the brush shown in FIGS. 15, 16, and 17.

In FIG. 18, the bristle cleaning plate 56e is formed with bristle openings 162 having scalloped edges. Thus, a plurality of pointed teeth or serrations 164 project into each opening. Rounded scallop-shaped grooves 166 are formed between the teeth 164. A few of the bristles 22 are shown to illustrate the manner in which the bristles spread out to occupy the grooves 166 so that hair and other foreign material will be efficiently cleaned from the bristles when they are retracted through the openings 162.

In the construction of FIG. 19, the bristle cleaning plate 56f is formed with bristle openings 168. In this case, the edge of each opening 168 is formed with inwardly projecting serrations 170 which are generally in the shape of gear teeth. Thus, the inner ends of the teeth 170 are relatively square or blunt. The teeth 170 are separated by grooves 172 which are similar in size and shape to the teeth. As shown, the bristles 22 spread out into the grooves or notches 172 so that the bristles will be cleaned effectively when they are retracted through the openings 168.

The construction of FIG. 20 also utilizes blunt-nosed teeth or serrations 174 which project into the bristle openings 176 formed in the plate 56g. The construction is similar to that shown in FIG. 19, except that the teeth 174 are separated by relatively narrow slots or grooves 178. It will be particularly apparent from FIGS. 19 and 20 that the teeth or serrations have a combing effect on the bristles 22, to insure that the bristles will be effectively cleaned when they are retracted through the bristle openings.

FIG. 21 illustrates a construction in which the bristle cleaning plate 56h is formed with bristle openings 180 which are triangular in shape. In FIG. 22, the bristle openings 182 are square in shape. Bristle openings of various other polygonal shapes may be employed. The triangular, square and other polygonal shapes of bristle openings provide more effective cleaning of the bristles than the simple circular shape shown in FIG. 4. A few of the bristles 22 are shown in FIGS. 21 and 22 to illustrate the manner in which the bristles spread out to occupy the corners of the bristle openings. In each type of bristle opening shown in FIGS. 18 through 22, a high proportion of the bristles engage the edges of the bristle openings. This is also true of the constructions shown in FIGS. 12, 13 and 14. Thus, the bristles are effectively stripped of hair or other foreign matter when the bristles are retracted through the openings.

Various other modifications, alternative constructions and equivalents may be employed without departing from the true spirit and scope of the invention, as exemplified in the foregoing description and defined in the following claims.

We claim:

1. In a retractable brush, the combination comprising a casing having upper and lower relatively rotatable casing members, said upper casing member having a top wall with a generally cylindrical side wall extending downwardly therefrom, said lower casing member having a bottom wall with a generally cylindrical side wall extending upwardly therefrom, the lower end of said upper casing member and the upper end of said lower casing member having annular guide elements received one within the other to guide said members for relative rotation, a horizontal plate movable upwardly and downwardly within said casing, a fastener extending axially through said casing and said plate for holding said members of said casing together, a plurality of arcuate cylindrically curved cam members removably disposed within said casing and extending along said side walls of said members of said casing, each of said cam members being retained against circumferential movement by a pair of inwardly projecting ribs on said upper member, said ribs having overhanging lips for retaining said cam members, the ends of each of said cam members having projecting portions extending under said lips, said cam members being slidable into said upper casing member and being retained therein by said lower casing member, said lower wall having a large number of holes therein, said plate having a plurality of bristles extending downwardly therefrom into said holes and movable outwardly through said holes when said plate is moved downwardly, said plate having a plurality of notches formed in its edge, a plurality of fingers projecting upwardly from said lower wall and slidably received in said notches, said fingers and said bristles being effective to rotate said plate with said lower casing member, each of said cam members having an internal generally helical cam groove therein, and a plurality of cam follower elements projecting outwardly from said plate and slidably received in said grooves for moving said plate upwardly and downwardly in response to relative rotation of said casing members.

2. In a retractable brush, the combination comprising a casing having upper and lower members, means on said upper and lower casing members guiding said members for relative axial rotation, said upper member having an upper wall with a side wall extending downwardly therefrom, said lower member having a bottom wall with a plurality of holes therein, a generally flat horizontal plate movable upwardly and downwardly within said casing, a plurality of bristles mounted on said plate and extending downwardly into said holes for extending and retracting movement therethrough, a plurality of arcuate removable cylindrically curved cam plates extending along the inside of said side wall, said side wall having inwardly projecting ribs thereon engaging the ends of said cam plates to retain said cam members against circumferential movement, said ribs and the ends of said cam plates having elements slidably interlocking to retain said cam plates against radial inward movement, each of said cam plates having a generally helical cam groove therein, and cam follower elements projecting outwardly from said flat plate and slidably received in said grooves so that said flat plate and said bristles will be moved upwardly and downwardly in response to relative rotation between said upper and lower casing members.

3. In a retractable brush, the combination comprising a casing having upper and lower casing members, means on said upper and lower casing members guiding said members for relative axial rotation, said upper casing member having an upper wall with a side wall extending downwardly therefrom, said lower casing member having a bottom wall with a plurality of holes therein, a generally horizontal plate movable upwardly and downwardly within said casing, a plurality of bristles mounted on said plate and extending downwardly into said holes for extending and retracting movement therethrough, a plurality of arcuate removable cylindrically curved cam members extending along the inside of said side wall, said side wall having inwardly projecting elements thereon slidably engaging the ends of said cam members to retain said cam members against circumferential movement and radially inward movement, each of said cam members having a generally helical cam track thereon, and cam follower elements projecting outwardly from said plate and slidably engaging said tracks so that said plate and said bristles will be moved upwardly and downwardly in response to relative rotation between said upper and lower casing members.

4. The combination comprising a casing having upper and lower relatively rotatable casing members, said upper casing member having a top end wall with a generally cylindrical side wall extending downwardly therefrom, said lower casing member having a bottom end wall with a generally cylindrical side wall extending upwardly therefrom, the lower end of said upper casing member and the upper end of said lower member having annular guide elements received one within the other to guide said casing members for relative rotation, a horizontal plate movable upwardly and downwardly within said casing, a fastener extending axially through said casing and said plate for holding said casing members together, a plurality of arcuate cylindrically curved cam members removably disposed within said casing and extending along said side walls of said casing members, each of said cam members being retained against circumferential movement by a pair of inwardly projecting ribs on one of said casing members, said ribs having overhanging lips for retaining said cam members, the ends of each of said cam members having projecting portions extending under said lips, said cam members being slidable into said one casing member and being retained therein by the other of said casing members, said end wall on said other casing member having a large number of holes therein, said plate having a plurality of slender elongated elements extending generally perpendicular therefrom into said holes and movable outwardly through said holes when said plate is moved in one direction, said plate having a plurality of notches formed in its edge, a plurality of fingers projecting upwardly from said end wall of said other casing member and slidably received in said notches, said fingers and said elongated elements being effective to rotate said plate with said other casing member, each of said cam members having an internal generally helical cam groove therein, and a plurality of cam follower elements projecting outwardly from said plate and slidably received in said grooves for moving said plate upwardly and downwardly in response to relative rotation of said casing members.

5. The combination comprising a casing having first and second members, means on said casing members guiding said members for relative axial rotation, said first member having a first end wall with a side wall extending therefrom, said second member having a second end wall with a plurality of holes therein, a generally flat plate movable axially within said casing between said end walls, a plurality of slender elongated elements mounted on said plate and extending into said holes for extending and retracting movement therethrough, a plurality of arcuate cylindrically curved cam plates removably disposed along the inside of said side wall, said side wall having inwardly projecting ribs thereon engaging the ends of said cam plates to retain said cam members against circumferential movement, said ribs and the ends of said cam plates having elements slidably interlocking to retain said cam plates against radial inward movement, each of said cam plates having a generally helical cam groove therein, and cam follower elements projecting outwardly from said flat plate and slidably received in said grooves so that said flat plate and said elongated elements will be moved axially in response to relative rotation between said first and second casing members.

6. The combination comprising a casing having first and second casing members, means on said casing members guiding said members for relative axial rotation, said first casing member having a first end wall with a side wall extending therefrom, said second casing member having a second end wall with a plurality of holes therein, a plate generally parallel to said end walls and movable axially within said casing, a plurality of slender elongated elements mounted on said plate and extending into said holes for extending and retracting movement therethrough, a plurality of arcuate cylindrically curved cam members removably disposed along the inside of said side wall, said side wall having inwardly projecting elements thereon slidably engaging the ends of said cam members to retain said cam members against circumferential movement and radially inward movement, each of said cam members having a generally helical cam track thereon, and cam follower elements projecting outwardly from said plate and slidably engaging said tracks so that said plate and said slender elongated elements will be moved axially in response to relative rotation between said first and second casing members.

References Cited in the file of this patent

UNITED STATES PATENTS

| | | |
|---|---|---|
| 185,693 | Newton | Dec. 26, 1876 |
| 207,256 | Crane | Aug. 20, 1878 |
| 252,603 | Kennish | Jan. 24, 1882 |
| 1,386,756 | Benson et al. | Aug. 9, 1921 |
| 1,501,547 | Bassett | July 15, 1924 |
| 1,960,387 | Marcher | May 29, 1934 |
| 2,591,537 | Gordon | Apr. 1, 1952 |
| 2,644,183 | Kellett | July 7, 1953 |
| 2,660,183 | Gruring | Nov. 24, 1953 |
| 2,703,898 | Kellett | Mar. 15, 1955 |
| 2,865,039 | Kaye et al. | Dec. 23, 1958 |
| 2,881,460 | Baudouin | Apr. 14, 1959 |

FOREIGN PATENTS

| | | |
|---|---|---|
| 230,295 | Germany | Jan. 21, 1911 |